Patented Apr. 17, 1934

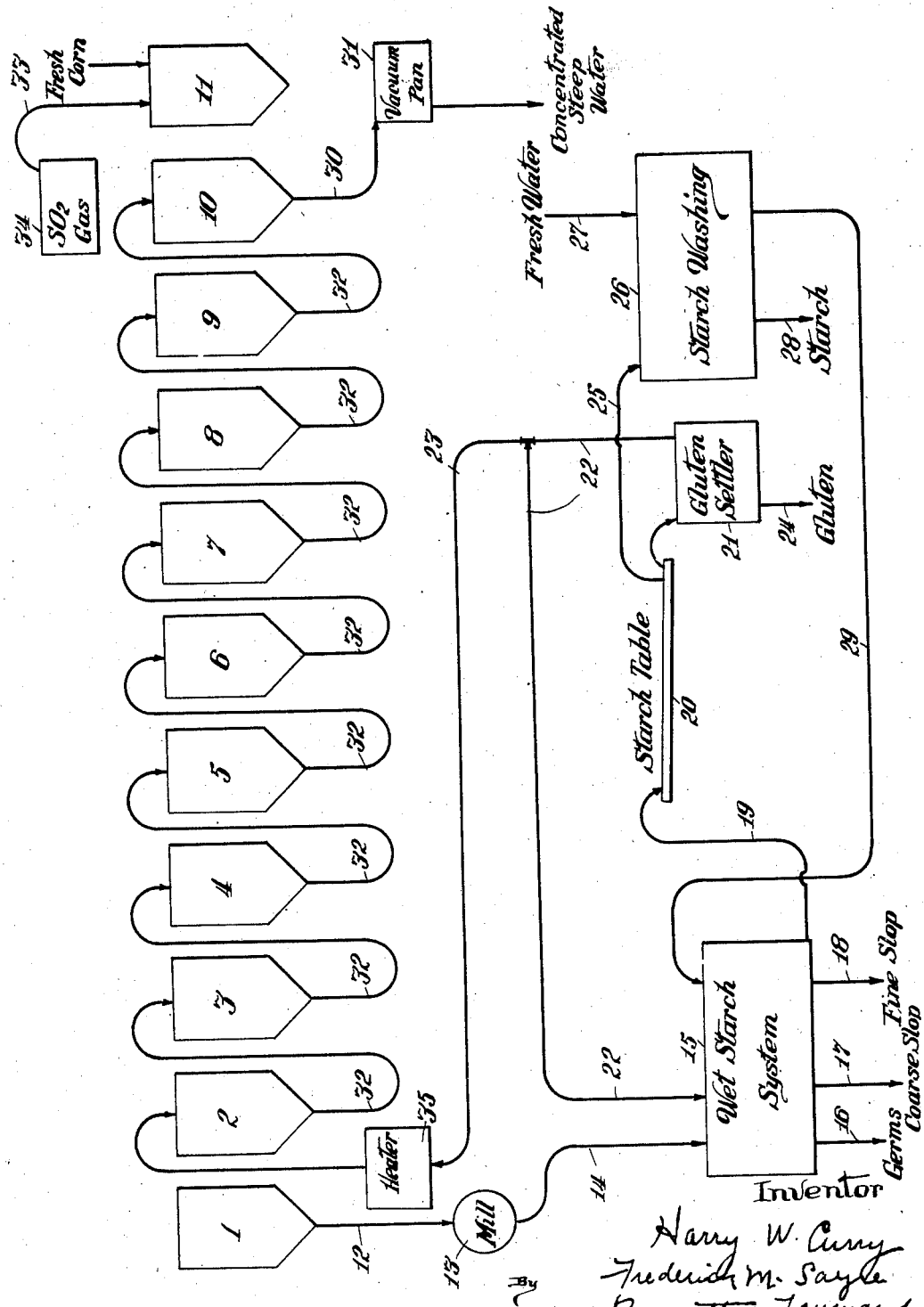

1,955,112

UNITED STATES PATENT OFFICE 1,955,112

STEEPING PROCESS

Harry W. Curry, Kansas City, Mo., and Frederick M. Sayre, Montclair, N. J., assignors to International Patents Development Company, Wilmington, Del., a corporation of Delaware Application November 19, 1930, Serial No. 496,676

8 Claims. (Cl. 127—68)

This invention relates to the manufacture from corn of starch and derivative products; and its object is to provide a novel method of steeping the corn, giving rise to certain improvements and advantages in the steeping operation and in the other subsequent starch making operations, in the quality and character of the resultant starch and derived products; and in the operations by which said derived products are manufactured.

It has been customary to steep corn with heated dilute sulphurous acid in a counter-current diffusion battery consisting of a series of steep tanks, through which the steeping liquid is circulated in such manner that the fresh liquid comes into contact first with the oldest batch of corn and then passes to the next oldest batch and so on and is ultimately withdrawn from the system after passing through the freshest batch of corn; the connections between the tank being changed so that at each stage a batch of fresh corn is brought into the system and a batch of steeped corn withdrawn therefrom. As a matter of convenience the end of the series of tanks receiving the fresh corn (tanks 10 and 11) may be called the head end of the system and the other end the tail end. The corn is ordinarily steeped for about 48 hours; and it has been customary to maintain the liquid in the steeping system at a temperature of about 130 degrees F., and to introduce the sulphurous acid in such liquid at a concentration (weight of $SO_2$ to weight of liquid—based on the customary iodine titration method of $SO_2$ determining concentration) of about 0.3 per cent. The liquid withdrawn from the head end of the system (light steep water) is ordinarily concentrated in vacuum pans and is frequently mixed with the non-starch substances of the corn which are usually disposed of for cattle feed, in order to save the soluble substances of the corn leached out by the steeping process. As the steep liquor passes from the tail end to the head end of the system its sulphurous acid becomes gradually depleted by evaporation and chemical combination so that in the tanks at the head end of the system containing the fresh corn there is little or no inhibitory effect produced on micro-organisms and/or enzymes.

The steeping operation, however, not only leaches out of the corn substances which are soluble when the corn is introduced into the steeps (it being one of the objects of the steeping operation to remove such substances).; but it also develops or creates additional solubles by subjecting the corn to influences which tend to make soluble substances which previously were insoluble. This is evidenced by the fact that leaching with ice water may yield only four per cent, approximately, of soluble substances, while the same grade of corn may yield eight per cent of solubles when subjected to steeping according to methods now current. These methods involving introducing the fresh corn at one end of the steeping system and the fresh sulphurous acid at the other—the steep water being run into the tank containing the corn which has been steeped the longest period appear to create or permit conditions—time and temperature being factors—which favor enzymic and/or micro-organic activity tending to develop solubility, particularly in respect to the protein or glutinous ingredient of the corn. Whatever the reasons may be, it appears to be certain that the present counter current steeping methods bring about increase of soluble substances and these methods, therefore, tend to create the very condition which it is one of the purposes of steeping to do away with, to wit; the presence in the corn going to the wet starch system of soluble substances. Obviously as the corn goes into the wet starch system (the starch separating operations) in moist condition, the amount of solubles carried into the wet starch system with the corn will be greater in proportion to the soluble content of the steep liquid. Moreover, when waste waters—gluten settler water and starch filter water—are returned to the steeping and wet starch systems for use in place of fresh water, as has been the practice recently, a further increase of solubles concentration will take place both in the steeps and wet starch system and in fact throughout the whole process. The soluble substances must ultimately be removed from the starch, to a very large extent, at least, especially when the starch is to be converted into corn syrup (glucose) or corn sugar, since soluble proteins, particularly, interfere with the converting and crystallizing operations; and the higher the soluble concentrations in the starch, the more equipment and more fresh water will be required for washing the starch, for example in washing or displacement filters. If the starch making system is to operate as a completely closed or cyclic system with no liquid issuing from the system except that withdrawn from the steeps for evaporation, together with the moisture contained in the starch, gluten and bran, the amount of fresh water available for starch washing must be limited to the amount which the system can absorb, since reasons of economy forbid a light steep water of too low a density. Hence it is desirable to reduce the soluble substances in the wet starch, tabling and washing systems rather than to increase them as the present steeping methods tend to do.

A primary purpose of this invention is to provide a method of to be employed in connection with or antecedent to the steeping of the corn in accordance with which the development of solubles in the corn in the steeping operation will be prevented or materially reduced; and this purpose is accomplished by a treatment of the grain during or prior to steeping, which operates, apparently, to weaken or inhibit the enzymic and/or micro-organic activity that tends, during the steeping operation, to make soluble the otherwise insoluble ingredients of the corn, particularly the protein ingredients. Moreover, this treatment is such as to destroy, weaken or inhibit the action of the enzymes and micro-organisms which pass into the wet starch system, so as to reduce their activity in this and the later stages of the starch manufacture in respect to the substances, soluble or insoluble or both, which may tend to bring about difficulties of a fermentative character.

The invention, therefore, has for its primary object a treatment of the corn prior to or during the steeping operation of such a character as to inhibit or materially check the enzymic and/or micro-organic activity that tends to take place in the steeps and at later stages of the starch manufacture, whereby the development of soluble substances in the corn is prevented or lessened, particularly during the steeping operation, but also during subsequent stages of the manufacture, and whereby the separating operations as between the starch and non-starch ingredients of the corn are facilitated and improved and the filtering or washing of the tabled starch rendered easier and more effective.

A further object of the invention is to utilize this improvement in connection with a system in which water derived from the wet starch system (gluten water) and water derived from the washing filters (starch water) are reused in the steeping or wet starch system, or in both, whereby the concentration of solubles throughout the process may be diminished and the entire process kept cleaner and the separating operations facilitated and improved with improvement also in the character of the starch and of the products, such as glucose and corn sugar, derived therefrom.

By the term "enzymic and/or micro-organic activity" we intend to include (without being committed to any particular theory on the subject) the activity of the enzymes and/or the bacteria, yeast, fungi or other micro-organism which, by their action on the corn, particularly on the protein constituent thereof, tend to increase solubility or which interfere with or produce substances interfering with the separating operations constituting the starch making process. The larger part of the increase in solubles during steeping is probably due to the action of enzymes on protein matter. The enzymes in question are probably from the germ of the corn, although possibly they may be secretions of micro-organisms.

The desired results may be obtained, at least in a measure, by (1) carrying on the steeping for a part of or for the whole period at a temperature substantially higher than has been customary heretofore.

(2) It is also possible to treat the grain during or before steeping with a relatively highly concentrated solution of sulphur dioxide, for example, with a one per cent solution ($SO_2$ calculated by the usual iodine titration method).

The methods (1) and (2) may be combined.

(3) However we prefer to treat the corn while substantially dry and prior to steeping with gaseous $SO_2$ and this method is illustrated in the accompanying drawing which shows the application of the improvement to a cyclic system of starch manufacture.

The drawing is a diagram illustrating, but in much simplified form, the entire starch making process.

A battery of eleven steep tanks is shown in the drawing. Any suitable number of tanks may be used. These tanks are numbered 1 to 11 inclusive. At the stage of the steeping operation illustrated tank 11 is being filled with fresh corn. The corn in tank 1 has been steeped and is being withdrawn through conduit 12, to the mill 13, from which the disintegrated corn passes through conduit 14 to the wet starch system indicated at 15. The wet starch system consists of gravity separators and reels or shakers for separating the germ and coarse and fine slops from the starch and gluten; the material being given an intermediate grinding between the slop separations to reduce residual coarse material to the necessary fineness for the fine slop separation. The germs are discharged from the wet starch system through conduit 16, the coarse slop by conduit 17 and the fine slop by conduit 18. These substances are all moist and their discharge from the system results in the elimination of a considerable amount of water from the process. The starch milk from the wet starch system, consisting of starch, gluten and water, passes through conduit 19 to the starch table 20, from which the gluten and water tail off into gluten settlers 21, the starch being deposited on the tables. After the gluten has settled in settler 21, the water in the settler is siphoned off through pipe 22, a part going through this pipe back to the wet starch system and a part through pipe 23 to tank 2 of the steeping system. The gluten is discharged from the system through outlet 24.

The starch on the starch tables 20 is removed, by flushing or otherwise, and passes through pipe 25 to the starch washing apparatus, indicated at 26, which may consist of one or more vacuum or pressure filters in which the starch is first dewatered and then washed with fresh water entering through pipe 27. The starch in moist condition is discharged from the system, as indicated at 28. The wash water or filtrate from the starch washing system passes through conduit 29 to the wet starch system.

If the system is to be a completely closed system, that is closed so far as the liquids are concerned, (except for the liquid withdrawn from the steeping system and the moisture contained in the discharged solids), the fresh water introduced at 27 must balance the water discharged from the system at outlets 16, 17, 18, 24 and 28 plus the light steep water discharged from steeping tank 10 through pipe 30 to the evaporating pans 31.

By decreasing the development of solubles in the steeps, the soluble concentrations throughout the process are diminished, making possible the use of a smaller amount of fresh water for washing; or a better washing operation can be effected with the same amount of water; or if desired, washing equipment may be diminished.

Also by reducing the concentration of solubles in the wet starch and tabling operations and by inhibiting the activity of enzymes and/or micro-organisms in the wet starch and tabling operations, by means of the improved steeping treatment referred to, these operations can be performed more conveniently and satisfactorily.

Referring now to the steeping operation: Steep tank 2 contains corn which has been steeped for the longest period; steep tank 3, corn which has been steeped for the next longest period, and so on, down to tank 10, which contains the freshest batch of corn undergoing steeping. The gluten water enters steep tank No. 2 so that the oldest batch of corn—that in tank 2—is being leached by the freshest steep water. The steep water from tank 2 passes through pipe 32 to steep tank 3 and thence through the other steeps by pipes designated by the same numeral.

The fresh corn introduced into tank 11 is treated with a sterilizing or disinfecting agent, preferably with gaseous $SO_2$ through pipe 33 from a source of supply 34. The amount of $SO_2$ may be 500 pounds per 1000 bushels of corn. The corn is thoroughly impregnated with the gas, which unites with the moisture in the corn to form sulphurous acid and perhaps combines chemically with some of the solid constituents of the grain, making it unnecessary to "sulphurize", that is introduce sulphurous acid into the steeping water entering the tail end of the system at tank 2, as has been customary with ordinary counter-current methods of steeping. It will be understood that the corn in steep tanks 10, 9 has been similarly treated with the sterilizing or disinfecting agent before these batches were successively cut into the steeping system. By sterilizing or disinfecting agent we mean any agent which inhibits or weakens the activity of the micro-organisms, whether bacterial, fungi, yeast or enzymes so as to prevent or retard the change from insolubility to solubility which tends to take place under ordinary steeping conditions, and the employment of which agent may bring about also a further inhibition, complete or partial, of micro-organic activity, in the subsequent stages of the starch manufacture.

After the stage of the steeping operation illustrated in the drawing has been completed, the connections between the steep tanks will be changed so that tank 2 will take the place of tank 1; tank 1, the place of tank 11; tank 11, the place of tank 10, and so on throughout the system, tank 1 now being at the head end of the system and tank 3 at the tail end, tank 2 being cut out for discharge of corn to the mill. The gluten water is preferably heated by heater 35 before being introduced into the steeping system and the desired temperature may be kept up in that system in any usual manner; and if desirable the steeped corn may be washed to reduce $SO_2$ before it goes to the wet starch system.

Advantages as have been set forth accrue to the entire starch making operation and its subsequent processes using the starch from the above described change in steeping procedure. The steeping operation itself is also benefitted. As the improvement prevents or materially reduces the change of insolubles to solubles, less water will be required for leaching out the soluble substances from the corn; or the steeping may be more protracted in order to improve the separation of the germs at the germ separator without increasing the development of solubles beyond that which has been customary. Or both these two advantages can be obtained with partial completeness. The improved steeping procedure avoids certain difficulties in evaporation of the steep water, due to the presence of protein substances, which, with the improved procedure are reduced in quantity. The proteins tend to coagulate and form rubbery masses in the pan. On the other hand, the percentage of salt in the steep water will be higher, which might give rise to the difficulties of scale on the evaporator tubes, but this difficulty can be overcome by known methods of treating steep water containing excessive quantities of mineral salts.

The invention has been described in a preferred embodiment and certain modifications suggested. It is our intention to cover by patent all modifications within the scope of the appended claims.

We claim:

1. In a process of manufacturing starch from corn comprising steeping the corn and subjecting the same in comminuted condition to separating operations; the improvement which consists in impregnating the corn before steeping with gaseous sulphur dioxide.

2. In a process of manufacturing starch from corn comprising steeping the corn and subjecting the same in comminuted conditon to separating operations; the improvement which consists in impregnating the corn before steeping with gaseous sulphur dioxide, using approximately 500 pounds of sulphur dioxide for 1000 bushels of corn.

3. In the process of manufacturing starch from corn comprising steeping the corn by a counter-current system in which the steeping liquid enters the system at the opposite end from the fresh corn: the improvement which consists in subjecting the corn at the end of the system at which the corn enters to a sterilizing operation in addition to the application thereto of the steeping liquid to inhibit development of solubles during the steeping operation.

4. In the process of manufacturing starch from corn comprising steeping the corn by a counter-current system in which the steeping liquid enters the system at the opposite end from the fresh corn: the improvement which consists in bringing fresh sulphur dioxide into contact with the corn at the end of the system at which the corn enters to inhibit development of soluble substances during the steeping operation.

5. In the process of manufacturing starch from corn comprising steeping the corn by a counter-current system in which the steeping liquid enters the system at the opposite end from the fresh corn: the improvement which consists in subjecting the corn before the steeping operation is commenced to a sterilizing operation to inhibit development of soluble substances during the steeping operation.

6. In the process of manufacturing starch from corn comprising steeping the corn by a counter-current system in which the steeping liquid enters the system at the opposite end from the fresh corn: the improvement which consists in bringing fresh sulphur dioxide into contact with the corn before the steeping operation is commenced to inhibit development of soluble substances during the steeping operation.

7. In the process of manufacturing starch from corn comprising steeping the corn by a counter-current system in which the steeping liquid enters the system at the opposite end from the fresh corn: the improvement which consists in bringing fresh sulphur dioxide in a gaseous state into contact with the corn before the steeping operation is commenced to inhibit development of soluble substances during the steeping operation.

8. In the process of manufacturing starch from corn comprising steeping the corn by a counter-current system in which the steeping liquid enters the system at the opposite end from the fresh corn: the improvement which consists in bringing fresh sulphur dioxide in a gaseous state into contact with the corn at the head end of the system to inhibit development of soluble substances during the steeping operation.

HARRY W. CURRY.
FREDERICK M. SAYRE.